United States Patent
Bolz

(10) Patent No.: US 9,458,888 B2
(45) Date of Patent: Oct. 4, 2016

(54) JOURNAL HOUSING FOR A CYLINDRICAL BEARING AND RELATED METHOD

(71) Applicant: Andritz Inc., Glens Falls, NY (US)

(72) Inventor: Edwin William Bolz, Queensbury, NY (US)

(73) Assignee: Andritz Inc., Glens Falls, NY (US)

( * ) Notice: Subject to any disclaimer, the term of this patent is extended or adjusted under 35 U.S.C. 154(b) by 74 days.

(21) Appl. No.: 14/546,208

(22) Filed: Nov. 18, 2014

(65) Prior Publication Data

US 2015/0139576 A1    May 21, 2015

Related U.S. Application Data

(60) Provisional application No. 61/905,650, filed on Nov. 18, 2013.

(51) Int. Cl.

| | |
|---|---|
| *F16C 33/74* | (2006.01) |
| *F16C 35/02* | (2006.01) |
| *F16J 15/16* | (2006.01) |
| *F16J 15/18* | (2006.01) |
| *F16C 17/02* | (2006.01) |
| *F16C 17/22* | (2006.01) |
| *F16C 33/20* | (2006.01) |
| *F16C 43/02* | (2006.01) |

(52) U.S. Cl.
CPC ............... *F16C 35/02* (2013.01); *F16C 17/02* (2013.01); *F16C 17/22* (2013.01); *F16C 33/20* (2013.01); *F16C 33/74* (2013.01); *F16C 43/02* (2013.01); *F16J 15/164* (2013.01); *F16J 15/184* (2013.01); *Y10T 29/49647* (2015.01)

(58) Field of Classification Search
CPC ........ F16C 17/02; F16C 17/22; F16C 33/74; F16C 35/02; F16C 43/02
See application file for complete search history.

(56) References Cited

U.S. PATENT DOCUMENTS

| | | | | |
|---|---|---|---|---|
| 4,789,168 A | * | 12/1988 | Daume | F16J 15/20 277/536 |
| 6,746,153 B2 | * | 6/2004 | Del Rio | F16C 17/02 384/276 |
| 6,834,862 B2 | * | 12/2004 | Wilkinson | F16J 15/183 277/510 |
| 2014/0328685 A1 | * | 11/2014 | Davis | F16C 11/083 416/113 |

FOREIGN PATENT DOCUMENTS

| | | | |
|---|---|---|---|
| CA | 1217404 | | 2/1987 |
| GB | 158480 | * | 4/1920 |
| GB | 583194 | * | 6/1944 |

* cited by examiner

*Primary Examiner* — James Pilkington
(74) *Attorney, Agent, or Firm* — Kerri Hochgesang; Robert Joseph Hornung

(57) ABSTRACT

To address the problem of flush fluid leakage under normal operating conditions in rotary machinery, an improved pack-box has been conceived. The pack-box has a rotary bearing concentrically disposed within the pack-box, wherein a circumferential segment of the rotary bearing is circumferentially fixed within the pack-box. The pack-box further comprises a wall-step that defines at least a first thermal expansion channel and an inner wall that defines at least a second thermal expansion channel.

7 Claims, 8 Drawing Sheets

JOURNAL HOUSING FOR A CYLINDRICAL BEARING AND RELATED METHOD

CROSS-RELATED APPLICATION

This application claims the benefit of U.S. Provisional Patent Application Ser. No. 61/905,650 filed on Nov. 18, 2013, the entirely of which is incorporated herein by reference.

BACKGROUND OF THE INVENTION

1. Technical Field

The present disclosure relates generally to a method and apparatus for reducing packing ring creep and fluid leakage in rotary machinery and more particularly to rotary bearings and pack-boxes used in low revolutions per minute (rpm) rotary machinery common in the pulp and paper and biofuel industries.

2. Related Art

In industries that use rotary machines—particularly large rotary machines having pressurized journal housings—it can be desirable to separate flush fluid commonly used in journal housings from process fluids commonly used in the body of the rotary machine.

Rotary bearings are usually disposed around the journal and are typically designed to reduce rotational friction caused by the spinning journal. The rotary bearings are generally annularly shaped, made of a material having a low coefficient of friction, and are sufficiently durable to support the weight of the journal. The clearance between the journal and rotary bearing may be filled with flush fluid to lubricate and cool the rotating journal.

A pack-box is a type of journal housing that contains packing rings disposed around the journal. Functional packing rings generally form tight seals around the journal and the pack-box and are generally used to prevent transmission of diffusible matter out of the pack-box. Conventional rotary bearings may rotate around substantially the same axis as the journal and may slide transversely within the pack-box.

Even with the presence of rotary bearings, friction cannot be entirely eliminated. As the journal moves against rotary bearings, sleeve inserts, packing rings, or other internal pack-box components, the journal generates heat. As temperature increases, so does pressure. Pack-boxes typically use packing rings to contain this pressure; however, these packing rings are prone to failure as a result of normal operating conditions. As a result, pressurized flush fluid can leak out of the pack-boxes and interfere with the process the rotary machine was designed to achieve. Flush fluid leaks can also create occupational hazards and shorten the useful life of equipment.

For example, flush fluid leaking into the process can be especially disruptive when the process requires strictly controlled operating parameters such as pH, temperature, or reactant concentration. Leaks can affect product yields and can prevent large-scale manufacturing of products requiring specialized biological agents active at narrow operating conditions. Conversely, leaks from the process into the pack-boxes may expose rotary equipment to hazardous process chemicals and shorten the useful life of the equipment. For example, in pressurized pre-treatment vessels commonly used in the manufacture of lignocellulosic biofuels, steam is often used in the pre-treatment process. This steam mixes with other process chemicals and can be highly corrosive. If the packing rings fail and the steam leaks into the pack-box, the steam will eventually weaken the internal components of the pack-box and render the rotary machine inoperable. When packing rings fail, there is also an increased the risk that the hazardous process chemicals may leak out of the pack-box entirely and expose operating personnel and adjacent equipment.

As the temperature and pressure inside of the pack-box increases, the rotary bearing absorbs heat and expands. A rotary bearing's transverse coefficient of thermal expansion may differ from the bearing's axial coefficient of thermal expansion. That is, a heated rotary bearing may expand parallel to the length of the journal at a different rate than the rotary bearing expands in diameter. While the amount of thermal expansion in the axial directions may be negligible, the transverse expansion can push outwardly against the packing rings. This transverse expansion can compromise the tight seal the packing rings were designed to create, thereby allowing flush fluid to diffuse around the packing rings and out of the pack-box. Operators have attempted to address this problem by using a packing gland follower bolted to the end of the pack-box. When leaks become apparent, the operators may adjust the packing gland follower transversely to press against the packing rings in the opposite direction of the rotary bearing expansion. As the packing rings are transversely pressed, the diameters of the packing rings expand axially to reform tight seals between the journal and the pack-box, thereby stopping leaks.

When the rate of journal rotation slows (e.g. during periods of machine deactivation) the rotary bearing cools and transversely shrinks. The packing rings, however, tend to retain their transversely compressed shape while shrinking axially. The tendency of the packing rings to retain their compressed shape is commonly known as "creep." Because of creep, a gap is formed between the packing rings and the cooled rotary bearing. If the gap remains present when the rate of journal rotation increases (e.g. when the machine is reactivated), flush fluid can flow into the gap and can provide further pressure on the packing rings as the temperature and pressure inside the pack-box begins to increase. Such pressure can accelerate leaks and packing ring wear. To avoid flush fluid leaks around the edges of the packing ring when the rotary machine is reactivated, operators generally tighten the packing gland follower further to close the gap and compress the packing rings against the cooled rotary bearing. This compression re-forms a tight packing ring seal.

As the temperature inside the pack-box increases, however, the rotary bearing re-expands transversely and further compresses the packing rings. After repeated cycles of machine activation and deactivation, the packing rings reach a threshold at which the packing rings cannot tolerate further transverse compression. If the packing rings are not timely replaced before the packing rings reach this tolerance threshold, the natural rotary bearing expansion resulting from normal rotary machine operation will press against the packing rings and cause the packing rings to fail, thereby dramatically increasing flush fluid leaks and contributing to loss of production.

System operators generally have to deactivate the rotary machinery to replace packing rings, or to remove broken packing rings. Replacement packing rings can be costly because packing rings are generally made from complex synthetic materials designed to withstand the high pressure and temperature common in pressurized pack-boxes. Accordingly, there is a need for an improved apparatus and method for reducing flush fluid leaks in pack-boxes for rotary machines while reducing rotary bearing and packing ring wear over conventional designs.

SUMMARY OF THE INVENTION

Briefly, because cooled packing rings may decompress axially but not sufficiently transversely, a periodic loosening of the packing gland follower would likely compromise the packing ring seals. That is, there would be nothing to exert transverse pressure on the packing rings to maintain a tight seal. As such, once compressed initially, the packing rings strongly encourage constant compression to remain effective.

The problem of flush fluid leakage due to creep in pressurized pack-boxes rotary machinery is mitigated by using a pack-box that includes a rotary bearing made of a material having a known coefficient of thermal expansion in a transverse direction, wherein the rotary bearing has at least one shoulder extending from the body of the rotary bearing, wherein the shoulder has a shoulder circumference greater than a body circumference, and wherein the rotary bearing is transversely fixed within the pack-box such that the rotary bearing may not slide transversely within the pack-box. Within the pack-box, there is a wall-step defining first thermal expansion channel adjacent to a bottom of the rotary bearing, wherein the first thermal expansion channel is configured to receive the rotary bearing expanding in a first transverse direction. Within the pack-box, there is also an inner wall defining a second thermal expansion channel adjacent to a shoulder end of the rotary bearing, wherein the second thermal expansion channel is configured to receive the rotary bearing expanding in a second transverse direction. Both thermal expansion channels can be configured to accommodate a predetermined amount of transverse rotary bearing expansion. In other embodiments, only the first thermal expansion channel may be configured to accommodate a predetermined amount of transverse rotary bearing expansion. In yet other embodiments, only the second thermal expansion channel may be configured to accommodate a predetermined amount of transverse rotary bearing expansion.

A pack-box in accordance with the present disclosure may be used in either low-rpm rotary machinery or high rpm rotary machinery. Low-rpm machinery may have journals that rotate in a range of about 0 rpm to about 100 rpm. Low-rpm machines may have journals that rotate at a linear speed of up to 20 meters per second (mps). High-rpm machinery may have journals that rotate at a rate greater than 100 rpm. Temperatures within typical low-rpm pack-boxes under normal operating conditions may range from about 140 degrees Celsius to about 200 degrees Celsius. In high-rpm pack-box houses, the temperature may exceed 200 degrees Celsius. In certain exemplary embodiments, the pressure within the pack-box may range from about 6 bar to about 25 bar. In other exemplary embodiments, the pack-box may be a high-pressure pack-box, configured to accommodate pressures ranging from about to 25 bar to about 42 bar. In other exemplary embodiments, the rotary bearings may be used in journal housings that operate under, or contain a vacuum. A pack-box and rotary bearing in accordance with the present disclosure may allow for rotary bearings to expand to a desirable length during known operating conditions.

It is an object of this disclosure to provide for desirable transverse expansion of the rotary bearing. It is also an object of this disclosure to reduce flush fluid leaks caused by overly compressed packing rings in pack-boxes. This disclosure also describes apparatuses and methods for increasing the useful working life of journal housings and rotary machinery generally, and pack-box, packing rings, journals, rotary bearings, and other components within the pack-box, including sleeves in particular.

In certain exemplary embodiments, desirable rotary bearing expansion may include having the transversely expanding rotary bearing abut the nearest packing ring to substantially avoid initial packing ring compression. In other exemplary embodiments, desirable rotary bearing expansion may comprise configuring the rotary bearing to expand in a first transverse direction—toward the rotary body—to a greater extent than the rotary bearing expands in a second transverse direction—away from the rotary body. Placing the shoulder of the rotary bearing adjacent to the packing rings may contribute to desirable expansion in accordance with this embodiment.

In still other exemplary embodiments, desirable transverse expansion of the rotary bearing may include compressing the packing rings of a known material to a predetermined amount to prevent flush fluid leaks and improve process performance. In still other exemplary embodiments, the pack-box and rotary bearing may be configured to allow for the transversely expanding bearing to compress other components within the pack-box, such as sleeves, additional rotary bearings, and spacers a desirable amount to initiate a change in pack-box operating conditions.

In one exemplary embodiment, the rotary bearing may be a shoulder bushing. In another exemplary embodiment, the bearing may be a pin bearing. In yet another exemplary embodiment, the bearing may be a bearing lantern ring with flush fluid holes. In yet other exemplary embodiments, multiple rotary bearings and multiple sets of packing rings may be used to accommodate longer journals within a pack-box.

The following exemplary embodiments may commonly be used in the biofuel and the pulp and paper industries. Rotary machinery that may use a pack-box may include inverted top separators, rotary outlet devices for digesters, metering screws, journal incline drains, and steam mixing conveyors. However, it will be understood that the embodiments disclosed herein are not limited to usage in these industries.

BRIEF DESCRIPTION OF THE DRAWINGS

The foregoing will be apparent from the following more particular description of exemplary embodiments of the disclosure, as illustrated in the accompanying drawings in which like reference characters refer to the same parts throughout the different views. The drawings are not necessarily to scale, with emphasis instead being placed upon illustrating embodiments of the disclosed device.

DETAILED DESCRIPTION OF THE INVENTION

The following detailed description of the preferred embodiments is presented only for illustrative and descriptive purposes and is not intended to be exhaustive or to limit the scope and spirit of the invention. The embodiments were selected and described to best explain the principles of the invention and its practical application. A person of ordinary skill in the art will recognize that many variations can be made to the invention disclosed in this specification without departing from the scope and spirit of the invention.

Figure 3A:
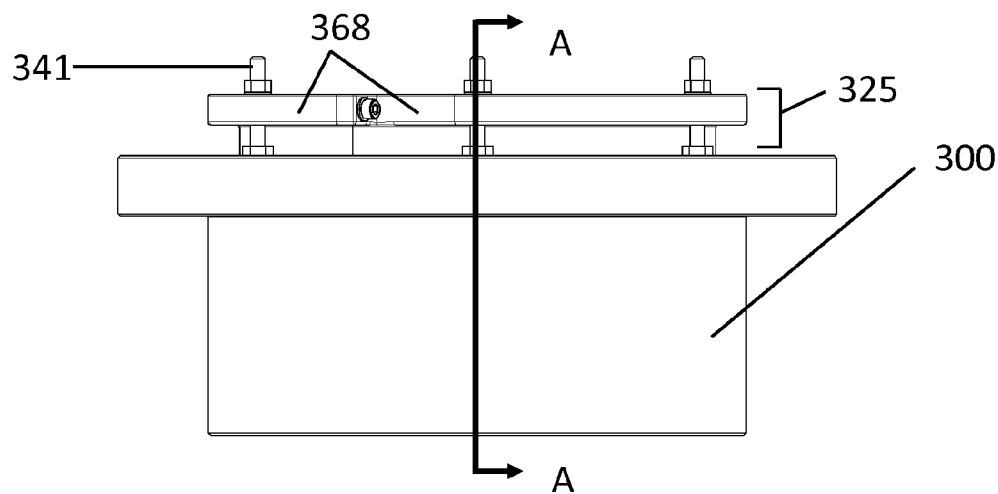
FIG. 3A is a side view of an exemplary pack-box and packing gland follower, in accordance with the present disclosure.
Figure 3B:
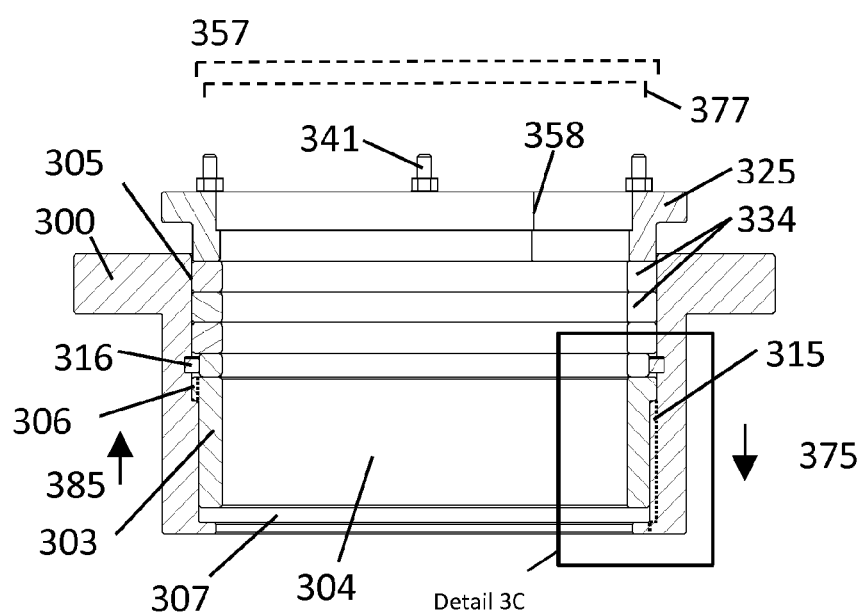
FIG. 3B is a cross-sectional view of an exemplary pack-box depicting a rotary bearing, internal retaining ring, multiple packing rings, and a packing gland follower, in accordance with the present disclosure.
Figure 3C:
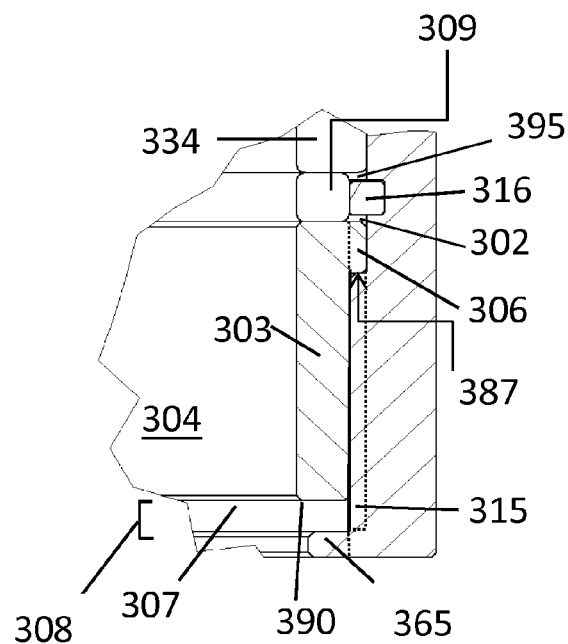
FIG. 3C is an enlarged cross-sectional view of an exemplary rotary bearing, internal retaining ring, and the first packing ring shown in FIG. 3B, in accordance with the present disclosure.
Figure 3D:
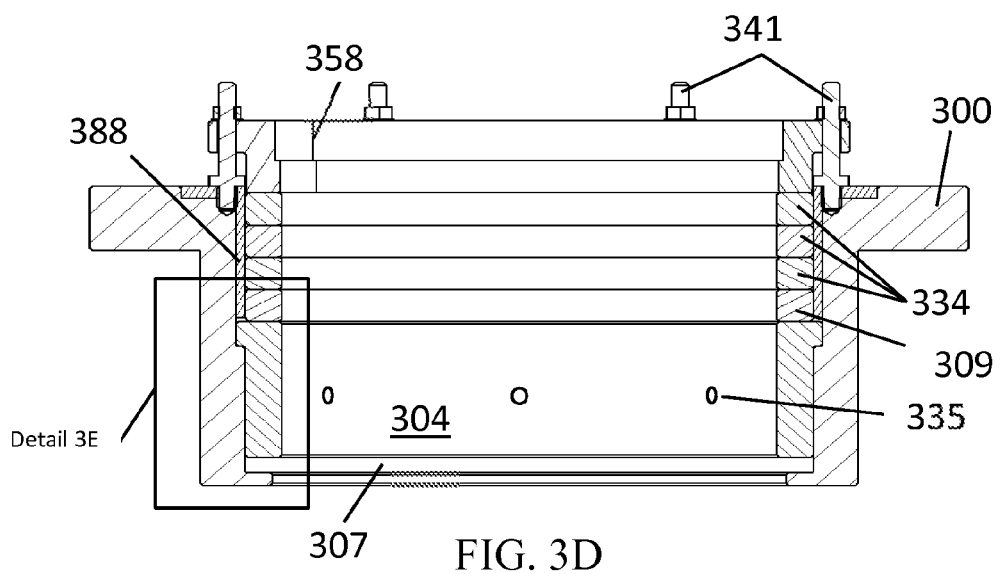
FIG. 3D is a cross-sectional view of an exemplary pack-box depicting a rotary bearing, internal retaining ring, multiple packing rings, packing ring sleeve, and a packing gland follower, in accordance with the present disclosure.
Figure 3E:
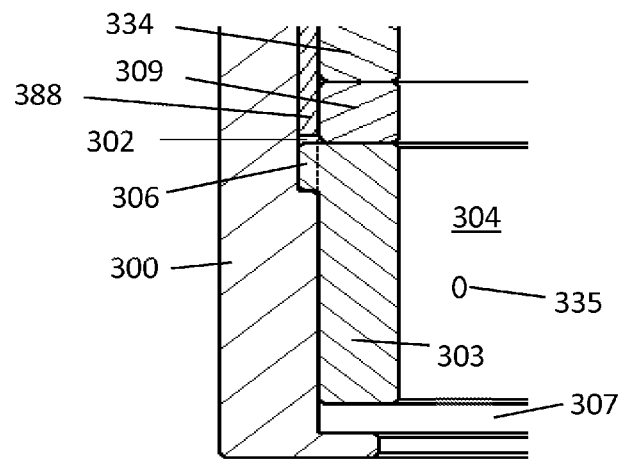
FIG. 3E is an enlarged cross sectional view of an exemplary rotary bearing showing the second thermal expansion channel embodied in FIG. 3D, in accordance with the present disclosure.
Figure 3F:
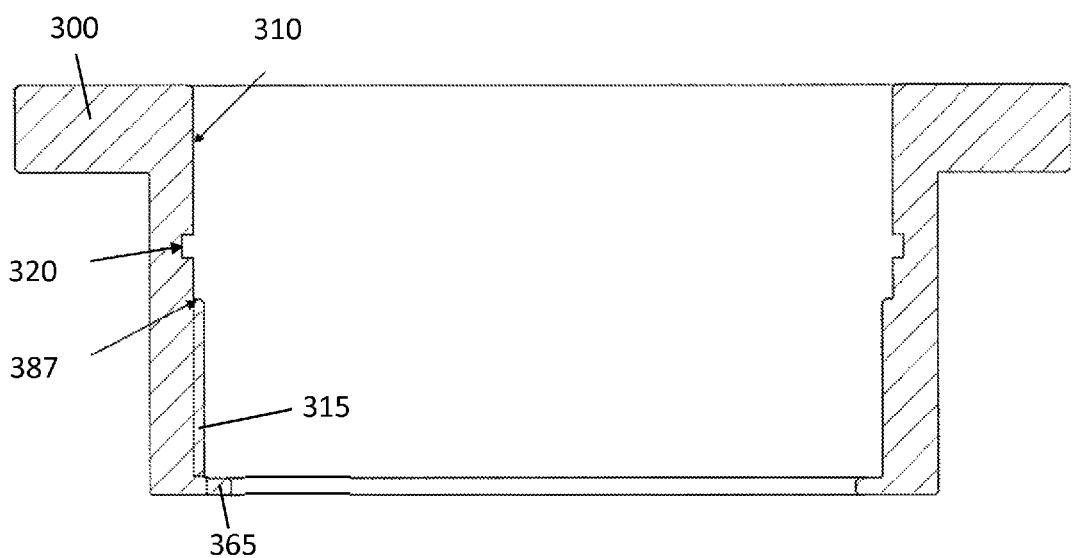
FIG. 3F is a cross-sectional view of an exemplary embodiment of a pack-box, in accordance with the present disclosure.
Figure 4:
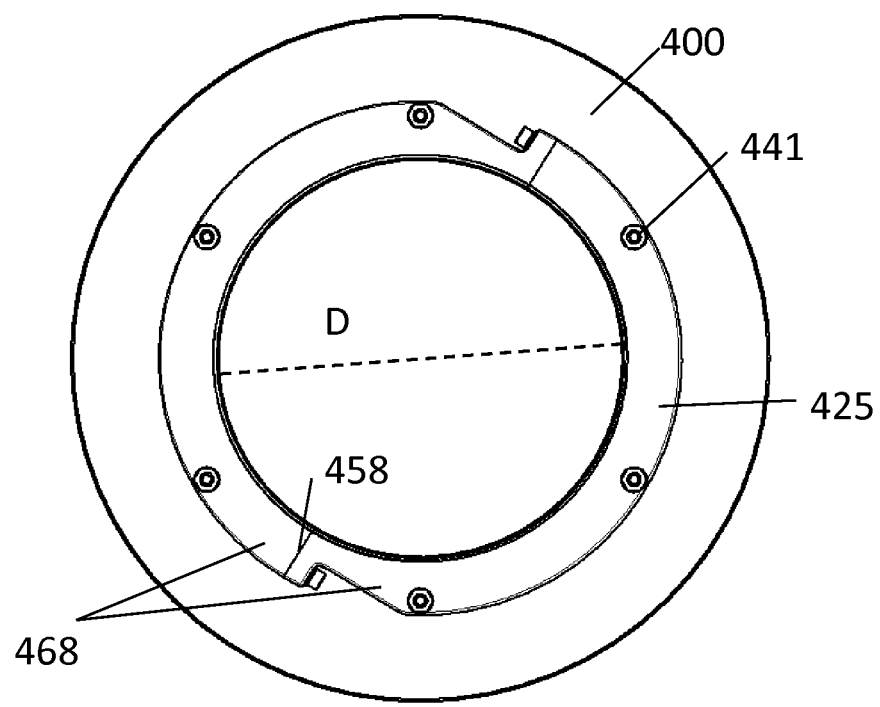
FIG. 4 is a perspective view from the top of an exemplary pack-box and packing gland follower shown in FIG. 3A, in accordance with the present disclosure.

The illustrative embodiments of the pack-box in accordance with this disclosure are shown in FIGS. 3 to 5. The present disclosure describes a pack-box suitable for use in rotary machinery in which the pack-box operates under positive or negative pressure, and methods for using the same. Although a pack-box is described, nothing in this disclosure prevents the invention from being used in a journal housing that does not contain packing rings. Currently, there is a need for a pack-box for a rotary bearing that permits the rotary bearing to expand naturally during the course of rotary machine operation without contributing to flush fluid leaks.

Without being bounded by theory, the coefficient of thermal expansion in a transverse direction may be a function of a material's circumferential height and circumferential area. The "circumferential height" refers to the distance between the inner circumference and the outer circumference of the rotary bearing. The circumferential area refers to the amount of material among the inner circumference, outer circumference, and a length of a section of rotary bearing. A rotary bearing having a first section (e.g. a shoulder) with a greater circumferential height and smaller circumferential area than a second section (e.g. a body) may have a lower coefficient of thermal expansion in the transverse direction than the second section.

In an exemplary embodiment, a journal housing may comprise a rotary bearing being made of a material having a known coefficient of thermal expansion in a transverse direction, wherein the rotary bearing has at least one shoulder extending from a body of the rotary bearing, wherein the shoulder has a shoulder circumference greater than a body circumference, and wherein the rotary bearing is transversely fixed within the journal housing such that the rotary bearing does not slide substantially transversely within the journal housing, a wall-step defining first thermal expansion channel adjacent to a bottom of the rotary bearing, wherein the first thermal expansion channel is configured to receive the rotary bearing thermally expanding in a first transverse direction, and an inner wall defining a second thermal expansion channel adjacent to a second end of the rotary bearing, wherein the second thermal expansion channel is configured to receive the rotary bearing expanding thermally in a second transverse direction.

In one exemplary embodiment, the rotary bearing may be a shoulder bushing. In another example embodiment, the bearing may be a pin bearing. In yet another example embodiment, the bearing may be a bearing lantern ring with flush fluid holes.

In another exemplary embodiment, the pack-box may be configured to accommodate the shoulder of the rotary bearing so that the internal wall of the pack-box includes a wall-step section and an inner wall section connected by a top of a wall-step. The shoulder of the rotary bearing may rest on the top of the wall-step such that the shoulder of the rotary bearing is substantially flush with the inner wall. The body of the rotary bearing may be substantially flush with the wall-step of the pack-box. The wall-step may extend past the body of the rotary bearing to define a first thermal expansion channel. The length of the first thermal expansion channel may accommodate the transverse expansion of a thermally expanding rotary bearing that can occur when the rotary bearing is being heated within the rotating journal. By allowing a rotary bearing to expand into a first thermal expansion channel and not into the multiple packing rings, the pack-box may reduce instances of leakage caused by compressed packing rings.

In one exemplary embodiment, a pack-box may comprise a rotary bearing concentrically disposed within the pack-box; a first packing ring adjacent to the first side of the rotary bearing, an internal retaining ring between the pack-box and the first packing ring inside of a recess in the pack-box, multiple packing rings adjacent to the first packing ring on a side opposite of the rotary bearing, a packing gland follower adjacent to the multiple packing rings on a side opposite of the first packing ring; a second thermal expansion channel defined by the inner wall, the internal retaining ring, the first packing ring, and the rotary bearing, and a first thermal expansion channel defined by the rotary bearing, the inner wall, and a journal.

In yet another exemplary embodiment, the pack-box may comprise: a first set of packing rings concentrically disposed within the pack-box toward a process end of the pack-box; a first rotary bearing concentrically disposed within the pack-box adjacent to the first set of packing rings; a bearing support disposed between the first rotary bearing and a second rotary bearing, such that the second rotary bearing is concentrically disposed within the pack-box; a second set of packing rings concentrically disposed within the pack-box toward the non-process end of the pack-box and adjacent to the second rotary bearing; an inner packing gland follower disposed adjacent the first set of packing rings and the second set of packing rings on a side opposite a journal side; an outer packing gland follower disposed on top of the second set of packing rings; a first large thermal expansion channel defined by the first rotary bearing and the pack-box; a first small thermal expansion channel defined by the first rotary bearing, the pack-box, and a first packing ring from the first set of packing rings; a second large thermal expansion channel defined by the second rotary bearing and the pack-box; and a second small thermal expansion channel defined by the second rotary bearing, the pack-box, and a first packing ring from the second set of packing rings.

A method for utilizing desirable effects of transverse thermal expansion in rotary bearings has been conceived comprising ascertaining the coefficient of thermal expansion in the transverse direction of a rotary bearing, manufacturing a pack-box for a rotary bearing having thermal expansion channels configured to receive ends of the rotary bearing as the rotary bearing expands thermally in a first transverse direction and a second transverse direction under known operating conditions, and fixing an outer circumference of the rotary bearing to the pack-box such that the rotary bearing may not slide substantially transversely within the pack-box. This method may further comprise manufacturing the pack-box housing to have a wall-step configured to define a first thermal expansion channel and an inner wall configured to define a second thermal expansion channel when the rotary bearing is concentrically disposed within the pack-box. The method may further comprise manufacturing the pack-box by casting, machining, or other common manufacturing techniques commonly used in industry.

In other exemplary embodiments, the packing ring compression due to transverse thermal expansion of the bearing may be desirable to the particular application of the rotary machine. A method for utilizing desirable effects of transverse thermal expansion in cylindrical bearings may comprise ascertaining the coefficient of thermal expansion in the transverse direction of a cylindrical bearing, manufacturing a pack-box for a cylindrical bearing having thermal expansion channels configured to receive ends of the cylindrical bearing as the cylindrical bearing expands in the transverse direction when heated. In applications where packing ring compression from the rotary bearing side is desirable, the thermal expansion channels may be shorter than the length the cylindrical bearing may expand when heated under operational conditions, such that the packing rings may be compressed from either the bearing side or the packing gland follower side. In certain embodiments, the packing rings may be compressed from both the bearing side and the packing gland follower side. In other applications, packing ring compression from the bearing side may not be desirable. In embodiments configured to address these applications, the length of the thermal expansion channel may be longer than the expected transverse expansion of the bearing when heated under operating conditions.

Figure 1:
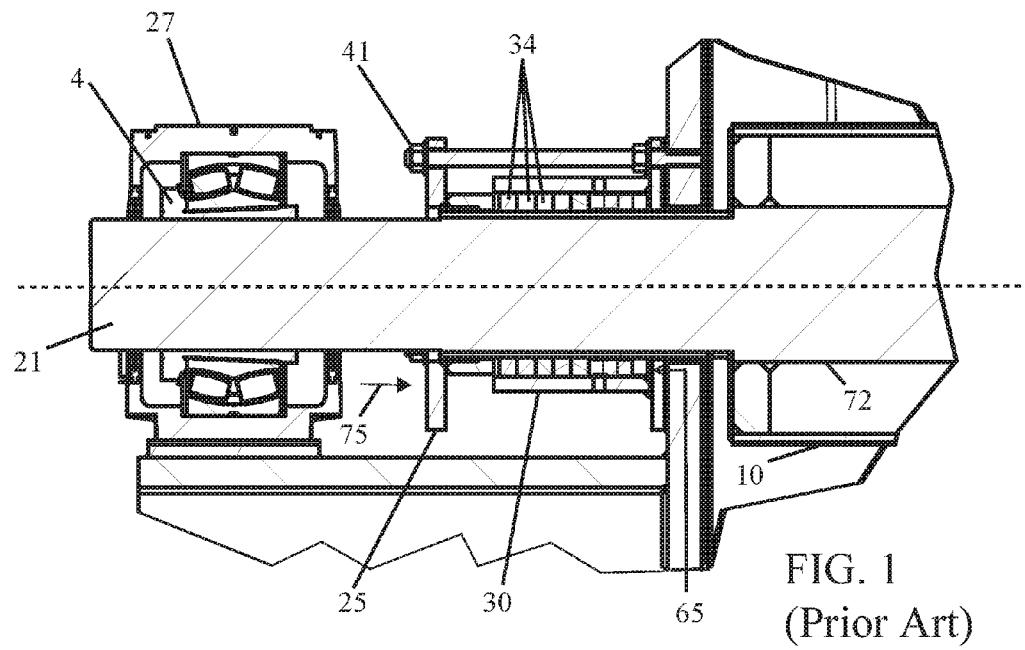
FIG. 1 is a cross-sectional view of a conventional multi-housing configuration in which a pack-box contains packing rings and a separate rotary bearing housing contains a rotary bearing.
Figure 2:
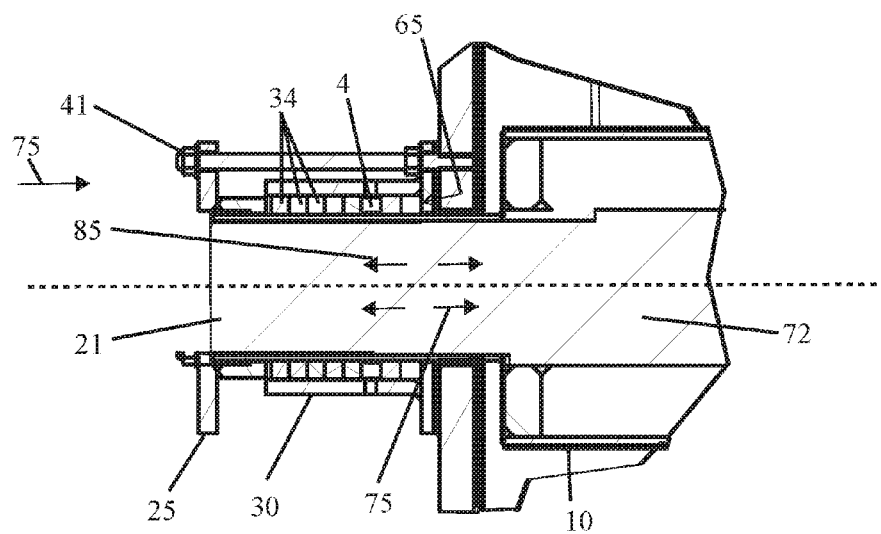
FIG. 2 is a cross-sectional view of a conventional pack-box wherein the rotary bearing and the packing rings share the same pack-box.

Referring now to the figures, there are generally two types of conventional journal housing configurations. These include the multi-housing configuration (FIG. 1) and single-housing configuration (FIG. 2). FIG. 1 illustrates a side cross-sectional view of the separate journal housings. In this arrangement, the rotary bearing housing 27 is separate and distinct from the conventional pack-box 30. A rotary body 10 rotates around a shaft 72. The journal 21 is the portion of the shaft 72 that extends through the conventional pack-box 30 and the rotary bearing housing 27. A rotary bearing 4 is arranged concentrically around the journal 21 in the rotary bearing housing 27. Multiple packing rings 34 are concentrically arranged around the journal 21 in the conventional pack-box 30 to prevent process fluid (not shown) from leaking out of the rotary body 10 along the journal 21 and into the conventional pack-box 30. The multiple packing rings 34 may also prevent flush fluids (not shown) from leaking out of the conventional pack-box 30 and into the rotary body 10 where the flush fluids may disrupt the manufacturing process occurring within the rotary body 10. The multiple packing rings 34 may also prevent flush fluid from leaking out of the conventional pack-box 30 and into the open air. When leaks become apparent under normal operating conditions, operators may tighten fastener 41 to press the packing gland follower 25 onto the multiple packing rings 34 in a first transverse direction 75 toward the rotary body 10. As the multiple packing rings 34 are transversely pressed against the packing gland follower 25, adjacent packing rings, and a bottom step 65 of the conventional pack-box 30, the multiple packing rings 34 expand slightly axially, and thereby press against the journal 21 and the inner wall of the conventional pack-box 30 housing to form tight seals. This process may temporarily stop any leaks created by journal deflection, but the process contributes to packing ring creep, which can compromise the tight seals when the rotary machine is deactivated or when the rate of journal rotation decreases. This process can encourage further packing ring compression in the first transverse direction 75 to compensate.

Using multiple journal housings can accommodate and distribute the weight of the shaft 72, journal 21, and rotary body 10 over a greater area. The weight of the rotary body 10 and the shaft 72 pressing downwardly on the journal 21 may deflect the journal 21. Such deflections are more pronounced in the longer journals 21 used in the multi-housing configuration. A deflected journal 21 can grind away at the rotary bearing 4 and the multiple packing rings 34, thus compromising the packing ring seals, causing flush fluid leaks, reducing the operating life of the rotary bearing 4 and multiple packing rings 34, and significantly increasing replacement and repair costs.

FIG. 2 illustrates a side cross-sectional view of a conventional journal housing in a single-housing configuration. In this conventional configuration, the journal housing is a conventional pack-box 30. Both the rotary bearing 4 and the multiple packing rings 34 occupy the same conventional pack-box 30. The rotary bearing 4 and the multiple packing rings 34 are disposed around the journal 21 and adjacently to each other. Under normal operating conditions, the rotary bearing 4 expands transversely in a first transverse direction 75 toward a rotary body 10 and in a second transverse direction 85 toward the packing gland follower 25. As the rotary bearing 4 expands in the first transverse direction 75, the rotary bearing 4 presses against the bottom step 65 of the conventional pack-box 30. As the rotary bearing expands in the second transverse direction 85, the rotary bearing 4 presses against the multiple packing rings 34. Pack-boxes 30 are commonly made of steel or stainless steel, whereas the multiple packing rings 34 are commonly made of plastics configured to withstand the high temperatures and pressures in conventional pack-boxes 30 while simultaneously being able to withstand the weight of the journal 21. These plastics are generally more pliable than the bottom step 65 of the conventional pack-box 30, such that the rotary bearing 4 expands into and compresses the multiple packing rings 34. When the rotary bearing 4 cools, the rotary bearing 4 generally shrinks transversely and may resume the rotary bearing's original dimensions, whereas creep causes the multiple packing rings 34 to retain a transversely compressed shape. To recompress the multiple packing rings 34 and re-form tight seals, operators tighten fasteners 41 to press the packing glad follower 25 onto the multiple packing rings 34 in the first transverse direction 75. This process may temporarily stop leaking created by transverse bearing expansion. However, this practice may place increased stress on the multiple packing rings 34, and may increase the failure rate of the multiple packing rings 34.

FIG. 3A is a side view of an exemplary embodiment of an improvement to a pack-box 300 as set forth in the present disclosure. A packing gland follower 325 extends out of the pack-box 300 and operators may use fasteners 341 to tighten the packing gland follower to compress the multiple packing rings 334 (FIG. 3B). The packing gland follower 325 may be a multi-piece packing gland follower; and may be a two-piece packing gland follower, such that the packing gland follower 325 comprises hemispheres 368 defining a slit 358 (FIG. 3B). The hemispheres 368 are configured to provide transverse pressure to the multiple packing rings 334 to different areas of the multiple packing rings 334 when tightened by fasteners 341. In still other exemplary embodiments, the packing gland follower 325 may be a single-piece packing gland follower. Fasteners 341 may include nuts, bolts, screws, pins, or other means commonly used with rotary machinery.

FIG. 3B is a cross-sectional view of an exemplary embodiment of a pack-box 300. The cross-sectional view bisects the components along a vertical plane A-A shown in FIG. 3A. The pack-box 300 may be configured to accept a type of rotary bearing 304 commonly known as a "shoulder bushing" to those having ordinary skill in the art, but similar bearings such as a pin bearing, bearing lantern ring, and other cylindrical bearings known in the art may be used. The rotary bearing 304 may comprise a shoulder 306 and a body 303. The shoulder 306 generally extends axially from the body 303 to define a shoulder circumference 357, which is greater than the body circumference 377. The shoulder circumference 357 is an outer circumference of the shoulder 306, whereas the body circumference 377 is an outer circumference of the body 303. The shoulder 306 may be positioned within the pack-box 300 such that the shoulder 306 is disposed upon a top 387 (in FIG. 3C) of a wall-step 315 extending into the interior of the pack-box 300. The body 303 of the rotary bearing 304 may be adjacent to the wall-step 315.

The rotary bearing 304 can be formed of rotary bearing material well known within the industry, such as, but not limited to, engineered resin, a synthetic fluoropolymer of tetrafluoroethylene, e.g., TEFLON brand material made by DuPont, and other durable, high-performance polyimide-based plastics, e.g., VESPEL brand material made by DuPont. The rotary bearing material may have low water absorption, a low coefficient for friction, and a coefficient of thermal expansion in the transverse direction that is comparable to steel. This transverse direction of thermal expansion may desirably alleviate the need for an axial coefficient of expansion. Such a material may also have high compressive strength and a high tensile strength. A first thermal expansion channel 307 is defined by the wall-step 315 extending past the bottom 390 (FIG. 3C) of the body 303 of the rotary bearing 304. The first thermal expansion channel 307 may be further defined by a bottom step 365 of the pack-box 300 and a journal 521 (FIG. 5). As the rotary bearing 304 absorbs heat, the rotary bearing 304 may extend in a first transverse direction 375 to a greater extent than the rotary bearing 304 expands in a second transverse direction 385. By expanding in a first transverse direction 375, the bottom 390 of the rotary bearing 303 may desirably extend into the first thermal expansion channel 307, thereby reducing the transverse compression of the rotary bearing 304 on the multiple packing rings 334 in a second transverse direction 385.

In other exemplary embodiments, the first thermal expansion channel 307 may have a height 308 (FIG. 3C) that is less than the amount of rotary bearing expansion in the first transverse direction 375. In embodiments in which the height 308 is less than the amount of rotary bearing expansion in the first transverse direction 375, the rotary bearing 304 may expand in the second transverse direction 385 to compress the multiple packing rings 334 to an extent desirable for a specific application. A predetermined amount of multiple packing ring compression from the rotary bearing 304 may be desirable for pressurized processes. Example rotary machines commonly associated with pressurized processes in the pulp and paper and biofuels industries may include pre-treatment reactors for lignocellulosic materials, steam mixing conveyors, and inverted top separators.

A first packing ring 309 (FIG. 3C) may be located adjacent to the top of the rotary bearing 304 and within an internal retaining ring 316. The internal retaining ring 316 may be used in conjunction with a first packing ring 309 and the top 387 of the wall-step 315 to secure the rotary bearing 304 transversely within the pack-box 300 such that the rotary bearing 304 cannot move substantially transversely within the pack-box 300. The internal retaining ring 316 may be fitted into a recess 320 in the pack-box 300. The internal retaining ring 316 can be made of materials that are configured to withstand high pressures, such as but not limited to, stainless steel, and grade 316 stainless steel. The internal retaining ring 316 may be the size of the first packing ring 309, or desirably, less than the size of the first packing ring 309. Additional packing rings that comprise the multiple packing rings 334 may be stacked adjacent to the first packing ring 309. The outer diameter of the first packing ring 309 may share the outer diameter of each of the additional packing rings that comprise the multiple packing rings 334, but is desirably less than the outer diameter of each of the additional packing rings that comprise the multiple packing rings 334. Both the first packing ring 309 and each of the additional packing rings that comprise the multiple packing rings 334 can be made of material that is known in the industry. In certain exemplary embodiments, this material may be a woven material impregnated with a synthetic fluoropolymer of tetrafluoroethylene. Such a synthetic fluoropolymer of tetrafluoroethylene may be TEFLON brand material made by DuPont.

A packing gland follower 325 may be inserted adjacent to the multiple packing rings 334 on a side opposite the first packing ring 309. The packing gland follower 325 can be more than one piece, but it is desirably one piece. The packing gland follower 325 can be made from the same material as the pack-box 300. Fasteners 341 adjustably engage the packing gland follower 325 to the pack-box 300.

FIG. 3C is an enlarged cross-sectional view of an exemplary rotary bearing 304 and surrounding elements depicted in FIG. 3B. This depiction more clearly shows the second thermal expansion channel 302 defined by an inner wall 310 (FIG. 3F) extending past the top of the rotary bearing 304. The second thermal expansion channel 302 is configured to accommodate the shoulder 306 expanding in the second transverse direction 385. In this depiction, the inner wall 310 extends past the top of the shoulder 306. The second thermal expansion channel 302 may be further defined by the bottom of the internal retaining ring 316, and the first packing ring 309. The shoulder 306 has a greater circumferential height than the body 303 of the rotary bearing 304. The shoulder 306 may additionally have a smaller circumferential area than the body 303. Therefore, the shoulder 306 of the rotary bearing 304 may expand in a second transverse direction 385 less than the body 303 of the rotary bearing 304 expands in the first transverse direction 375. The second thermal expansion channel 302 is generally smaller than the first thermal expansion channel 307. In embodiments in which an internal retaining ring is used, a small compression channel 395 may be defined by the internal retaining ring 316, the inner wall 310, the first packing ring 309, and the multiple packing rings 334. The small compression channel 308 allows a small amount compression of the first packing ring 309. The internal retaining ring 316 prevents a rotary bearing 304 from contributing to leakage within the pack-box 300 by substantially preventing the rotary bearing 304 from sliding transversely within the pack-box 300 when the rotary bearing 304 expands transversely. The second thermal expansion channel 302 may allow the rotary bearing 304 to slide transversely slightly when the rotary bearing 304 is cool, but the second thermal expansion channel substantially prevents transverse sliding of the heated rotary bearing 304.

FIG. 3D is a cross-sectional view of another exemplary embodiment of a pack-box 300 of FIG. 3A. In this particular embodiment, the rotary bearing 304 is depicted as a bearing lantern ring having a shoulder 306, a body 303, and which is characterized by fluid holes 335. Flush fluid (not depicted) may flow through the fluid holes 335 to cool or lubricate the journal see 521 or one or more journal sleeves 523 (FIG. 5). A journal sleeve 523 may be annularly disposed around the journal 521 and may be disposed between the journal 521 and the other components within the pack-box 300 such as the rotary bearing 304 and multiple packing rings 334. The exemplary embodiment of FIG. 3D includes a packing ring sleeve 388 inserted between the multiple packing rings 334 and the pack-box 300. The packing ring sleeve 388 can substantially fix the rotary bearing 304 within the pack-box 300 such that a thermally expanded rotary bearing 304 cannot slide transversely within the pack-box 300. In this manner, the packing ring sleeve 388 can perform a similar function to the internal retaining ring 316. Embodiments that use a packing ring sleeve 388 may use the packing ring sleeve 388 in place of the inner retaining ring 316. In other exemplary embodiments, the packing ring sleeve 388 may be modified to accommodate an inner retaining ring 316. Operators may adjust the packing ring sleeve 388 via fasteners 341 connected to the packing gland follower 325. The second thermal expansion channel 302 is defined by the top of the rotary bearing 304, the inner wall 310, the first packing ring 309 and the bottom of the packing ring sleeve 388. By loosening the fasteners 341 around the flange 367 of the packing ring sleeve 388, operators may raise the packing ring sleeve 388 partially from the pack-box 300, thereby adjusting the second thermal expansion channel 302.

Although an internal retaining ring 316 and a packing ring sleeve 388 are desirable means to secure the rotary bearing 304 transversely within the pack-box 300, nothing in this disclosure should exclude other means of securing the rotary bearing 304 transversely within the pack-box 300. Other means may include securing at least one shoulder 306 into a recess in the journal 521. A recess in a journal sleeve 523 may also be used. In embodiments in which the shoulder 306 extends radially toward the axis of rotation of the journal, the shoulder 306 may be transversely fixed in much the same manner as a shoulder 306 extending radially outward is transversely fixed.

FIG. 3E is an enlarged section of FIG. 3D depicting the second thermal expansion channel 302 in greater detail. The rotary bearing 304 has fluid holes 335 arranged throughout the rotary bearing 304. These fluid holes 335 allow flush fluid to communicate with the journal 521 or a journal sleeve 523 to cool the elements within the pack-box 300 during operation. The first thermal expansion channel 307 is shown below the rotary bearing 304. The packing gland follower 325 may be one or more pieces, but desirably one piece. The packing gland follower 325 may be made of the same material as the pack-box 300. The packing gland follower 325 can be attached to the pack-box 300 using fasteners 341. The fasteners 341 may also prevent the packing ring sleeve 388 from moving transversely within the pack-box 300. The pack-box 300 may define a flush fluid conduit 531 (FIG. 5). The flush fluid may enter the flush fluid conduit 531 and flow through the fluid holes 335 in the rotary bearing 304. After communicating with the elements within the pack-box 300, the flush fluid may exit through the same fluid holes 335 and out of the pack-box 300 through a separate the flush fluid conduit 531.

FIG. 3F is a cross-sectional view of an exemplary embodiment of a pack-box 300. The internal elements of the pack-box 300 have been removed in this depiction to more clearly emphasize the structure of the pack-box 300 of FIG. 3B. The pack-box 300 can be made of material that can withstand the high temperatures within the pack-boxes 300. These materials include, but are not limited to, grade 304 stainless steel, grade 316 stainless steel, or grade 2205 stainless steel. The pack-box 300 may have a wall-step 315 and an inner wall 310 of the pack-box 300. The diameter of the wall-step 315 is less than a diameter of the inner wall 310. A top 387 of the wall-step 315 may connect the wall-step 315 to the inner wall 310. The height of the wall-step 315 is greater than the height of a rotary valve. A recess 320 configured to contain an internal retaining ring 316 can also be included in the inner wall 310. In other embodiments, the recess 320 may be omitted.

FIG. 4 is a top-down view of the pack-box 400 shown in FIG. 3A. The pack-box 400 includes a packing gland follower 425 attached by fasteners 441. The fasteners 441 can be adjusted to ensure a proper seal around a journal (not shown) to prevent leakage. In this embodiment, the packing gland follower 425 is a two-piece packing gland follower comprising hemispheres 468 defining a slit 458. The hemispheres 468 are configured to provide transverse pressure to the multiple packing rings 334 at different areas of the multiple packing rings 334 when tightened by fasteners 441. Diameter D represents the inner diameter of the packing gland follower 425. The rotary bearing 304 and multiple packing rings 334 may have substantially the same diameter.

Figure 5A:
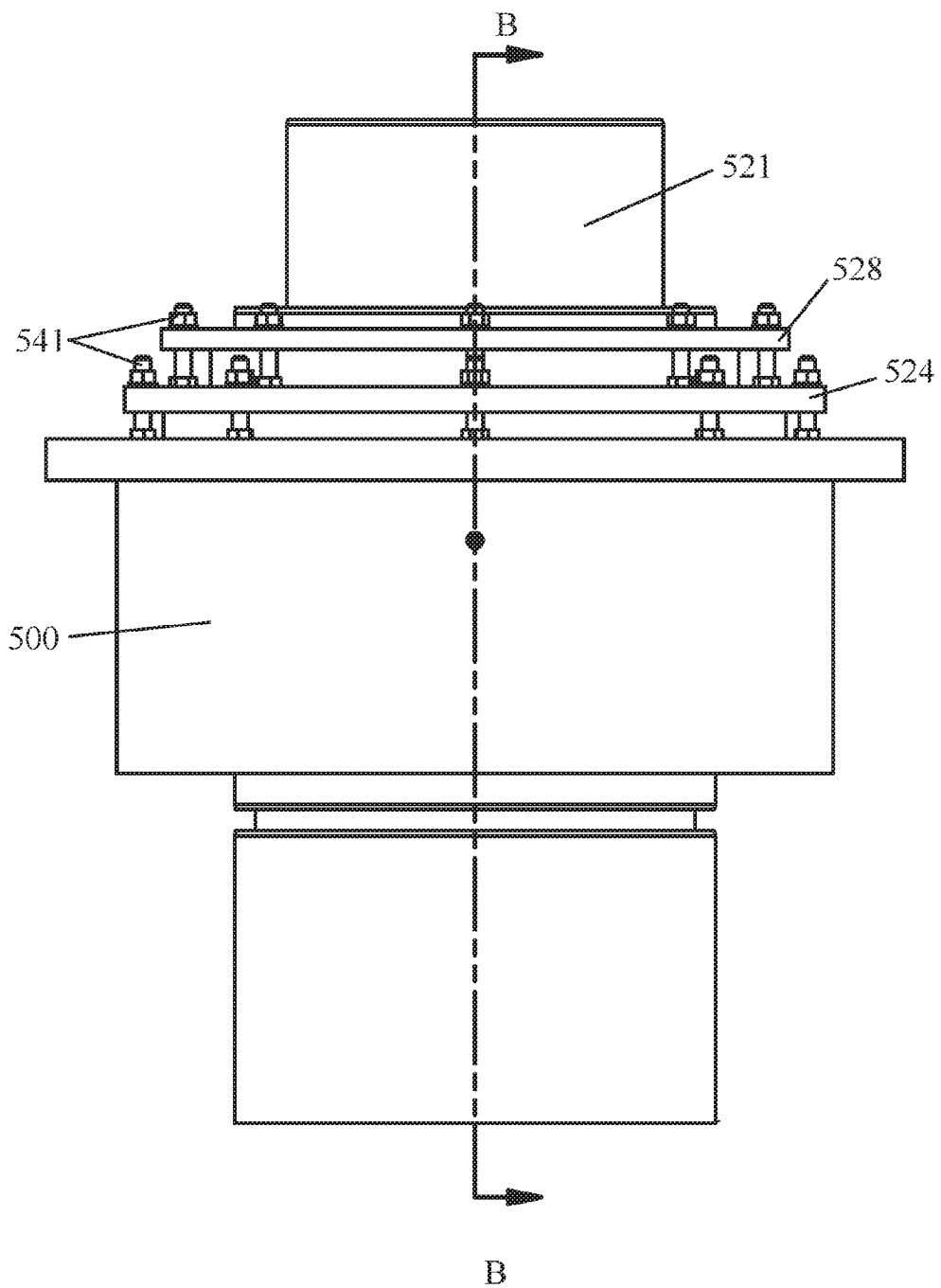
FIG. 5A is a perspective view of the side of an exemplary pack-box having an inner packing gland follower and an outer packing gland follower, in accordance with the present disclosure.

FIG. 5A is a side view of another exemplary pack-box 500. A journal 521 extends through the pack-box 500 whereby an end may be connected to a rotary body (see 10 in FIG. 1). In this exemplary embodiment, multiple rotary bearings 540, 550 and multiple sets of packing rings 532, 536 are used to prevent flush fluid from leaking out of either end of the pack-box 500. An inner packing gland follower 524 and an outer packing gland follower 528 may be adjusted via fasteners 541 to compress the second set of packing rings 536 (FIG. 5B) and the first set of packing rings 532 (FIG. 5B) respectively.

Figure 5B:
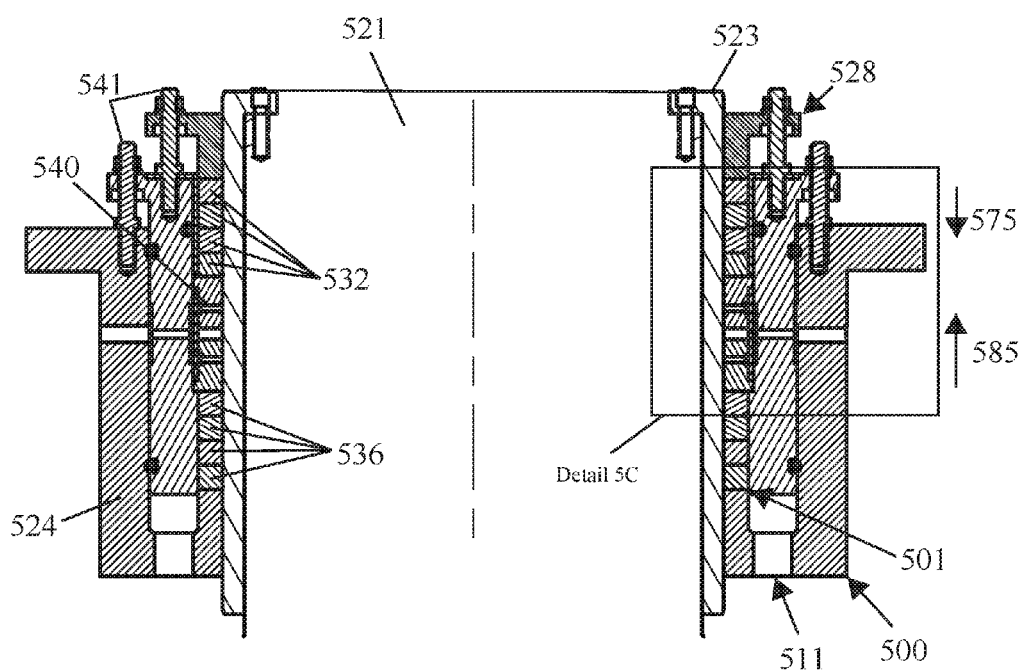
FIG. 5B is a cross-sectional view of the exemplary embodiment shown in FIG. 5A, and depicts a first rotary bearing, a second rotary bearing, a first set of packing rings, and a second set of packing rings, in accordance with the present disclosure.

FIG. 5B is a cross sectional view of the exemplary embodiment shown in FIG. 5A bisected along the vertical plane B-B in FIG. 5A. A journal 521 and a journal sleeve 523 surrounding the journal 521 are also depicted. The pack-box 500 includes a flush fluid conduit 531 (FIG. 5C) that permits flush fluid to enter and exit the pack-box 500. An operator may adjust the outer packing gland follower 528 to adjust compression in a first transverse direction 575 on a first set of packing rings 532. This first set of packing rings 532 may be optionally encased in a packing ring sleeve 588. The first set of packing rings 532 may rest against a first rotary bearing 540 fixed to the pack-box 500 in the manner described in FIG. 3B. A small thermal expansion channel 502 (FIG. 5C) and a large thermal expansion channel 507 (FIG. 5C) may abut either side of the first rotary bearing 540 in the manner described in FIG. 3B. A bearing support 545 may traverse the flush fluid conduit 531 to support the first rotary bearing 540 and a second rotary bearing 550. The bearing support 545 may be used in lieu of the wall step 315 and may be used to define the large thermal expansion channel 507 at the bottom of the first bearing 540 and second bearing 550. The second rotary bearing 550 and a second set of packing rings 536 may be arranged in an opposite configuration than the configuration for the first rotary bearing 540 and first set of packing rings 532 such that the bottom of the second rotary bearing 550 faces the bottom of the first rotary bearing 540. That is, the large thermal expansion channel 507 may be located next to the body 503 of the second rotary bearing 550, which in turn may be located next to the shoulder 306, which is in turn located next to a small thermal expansion channel 502 and a second set of packing rings 536. A protruding step 501 of the pack-box 500 may support the second set of packing rings 536. The protruding step 501 allows the second set of packing rings 536 to be compressed in a second transverse direction 585 when the inner follower 524 is tightened in a first transverse direction 575. As the inner packing gland follower 524 is tightened in the first transverse direction 575, the inner packing gland follower 524 exerts force on the packing ring sleeve 588, which in turn exerts force on the bearing support 545. This bearing support 545 may then transfer the force to the second set of packing rings 536 via the second rotary bearing 550. One or more housing drainage slots 511 may be defined by the bottom of the pack-box 500. These housing drainage slots 511 may allow process fluid (not shown) that may enter the pack-box 500 to drain from the pack-box 500 and re-enter the process (not shown).

This embodiment allows for the first rotary bearing 540 and the second rotary bearing 550 to expand parallel to the journal 521 without substantially compressing the first set of packing rings 532 or the second set of packing rings 536. The configuration of the first set of packing rings 532 and the second set of packing rings 536 form a tight seal between the pack-box 500 and the journal 521 to prevent leaks of flush fluid out of the pack-box 500, and to prevent leaks of process fluid into the pack-box 500. This embodiment may prevent the problems associated with journal deflecting because the packing rings and the rotary bearings may contain the journal 521 over a relatively small area.

Figure 5C:
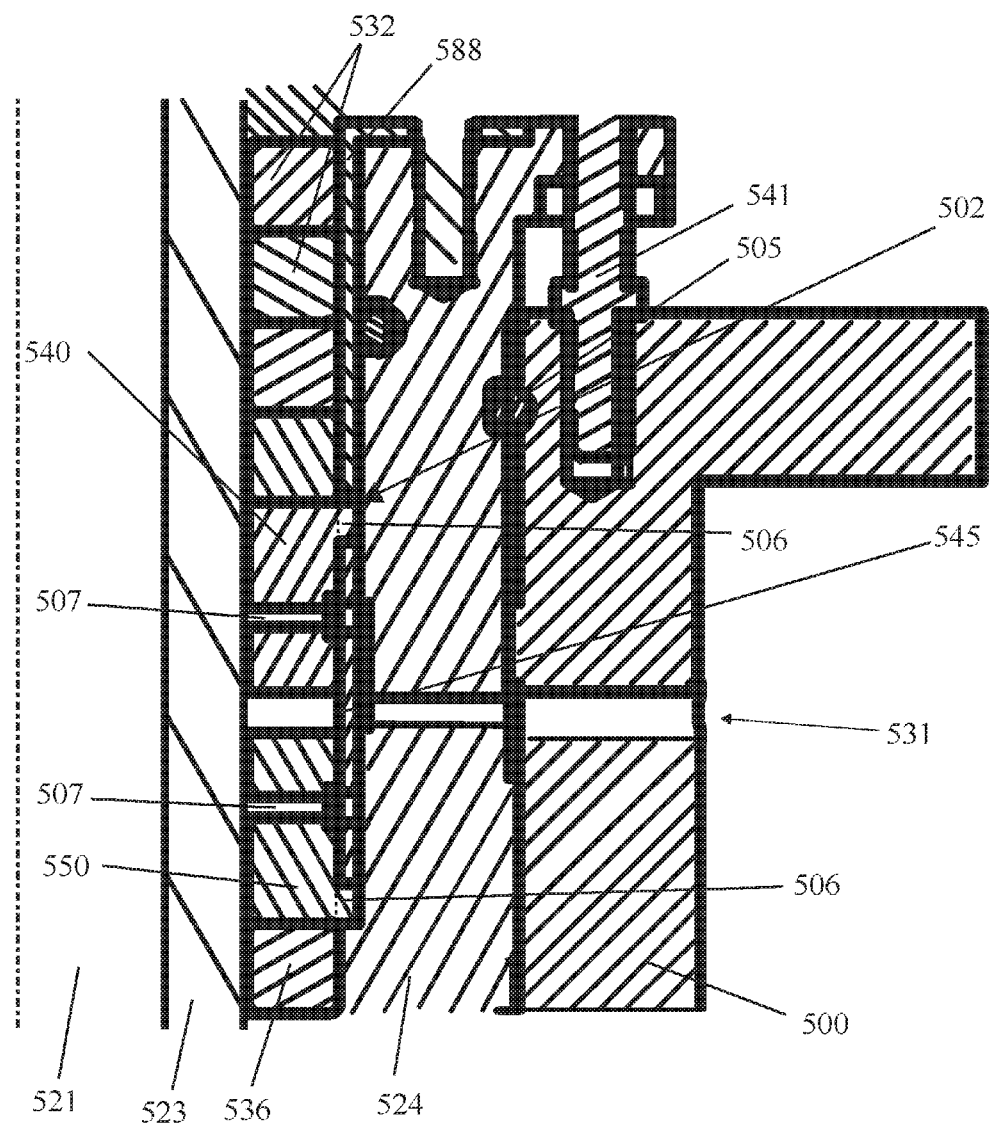
FIG. 5C is an enlarged cross-sectional view of the first rotary bearing and the second rotary bearing shown in FIG. 5B, in accordance with the present disclosure.

FIG. 5C is a close up perspective of the flush fluid conduit 531, first rotary bearing 540, and second rotary bearing 550 of FIG. 5B. In this view, the small thermal expansion channel 502 is located next to the shoulder 506 of the first rotary bearing 540 is seen in more detail. An O-ring 505 can provide a seal between the outer packing gland follower 528 and the inner packing gland follower 524. The large thermal expansion channel 507 is also shown next to the opposite end of the first rotary bearing 540 and the corresponding end of the second rotary bearing 550. Flush fluid (not shown) may enter the flush fluid conduit 531 to cool and/or lubricate the journal sleeve 523 and journal 521.

While this invention has been particularly shown and described with references to example embodiments thereof, it will be understood by those skilled in the art that various changes in form and details may be made therein without departing from the scope of the invention encompassed by the appended claims.

I claim:

1. A pack-box for rotary machinery comprising:
   a rotary bearing concentrically disposed within the pack-box such that a portion of an outer circumference of the rotary bearing is transversely fixed to an inner wall of the pack-box such that the rotary bearing does not slide substantially transversely within the pack-box, wherein the rotary bearing comprises a material having a known coefficient of thermal expansion in a transverse direction;
   a first packing ring having a first side and a second side, wherein the first side of the first packing ring is adjacent to a shoulder end of the rotary bearing;
   an internal retaining ring disposed between the inner wall of the pack-box and the first packing ring;
   multiple packing rings arranged on the second side of the first packing ring;
   a packing gland follower disposed adjacently to a last packing ring of the multiple packing rings, wherein the last packing ring is disposed furthest from the shoulder end of the rotary bearing;
   a first thermal expansion channel defined by a wall-step of the pack-box, a first step of the pack-box, a first end of the rotary bearing, wherein the first end of the rotary bearing is oppositely disposed from the shoulder end of the rotary bearing, and a journal; and
   a second thermal expansion channel defined by the shoulder end of the rotary bearing, the first side of the first packing ring, a first side of the internal retaining ring, and the inner wall of the pack-box, wherein the first thermal expansion channel is configured to receive the rotary bearing thermally expanding in a first transverse direction, and wherein the second thermal expansion channel is configured to receive the rotary bearing thermally expanding in a second transverse direction.

2. The pack-box of claim 1, wherein the rotary bearing is a shoulder bushing and wherein the rotary bearing is made of a polyimide-based plastic or a synthetic fluoropolymer of tetrafluoroethylene.

3. The pack-box of claim 1, wherein the rotary bearing is a bearing lantern ring, having areas defining holes configured to communicate flush fluid from an outer circumference to an inner circumference.

4. The pack-box of claim 1 further comprising a packing ring sleeve inserted between the packing rings and the pack-box, and wherein the packing gland follower is one piece.

5. A pack-box comprising:
   a first set of packing rings concentrically disposed within the pack-box;
   a first rotary bearing adjacent to the first set of packing rings;
   a rotary bearing support disposed between the first rotary bearing and a second rotary bearing, wherein the first rotary bearing and the second rotary bearing have a circumference transversely fixed to an inner wall of the pack-box such that each rotary bearing does not slide substantially transversely within the pack-box, wherein each rotary bearing comprises a material having a known coefficient of thermal expansion in a transverse direction;

a second set of packing rings concentrically disposed within the pack-box and adjacent to the second bearing;

an inner packing gland follower disposed adjacent the first set of packing rings and the second set of packing rings on a side of the first set of packing rings opposite from a journal side;

an outer packing gland follower disposed on a first side of the second set of packing rings, wherein the first side of the second set of packing rings is oppositely disposed from a second side of the second set of packing rings adjacent to the second bearing;

a first large thermal expansion channel defined by the first bearing and the pack-box;

a first small thermal expansion channel defined by the first rotary bearing, the pack-box, and a first packing ring from the first set of packing rings, wherein the first small thermal expansion channel is smaller than the first large thermal expansion channel;

a second large thermal expansion channel defined by the second rotary bearing and the pack-box; and a second small thermal expansion channel defined by the second rotary bearing, the pack-box, and a first packing ring from the second set of packing rings, wherein the second small thermal expansion channel is smaller than the second large thermal expansion channel.

6. The pack box of claim 5, wherein the rotary bearing is made of a material selected from the group consisting of a synthetic fluoropolymer of tetrafluoroethylene and a polyimide-based plastic.

7. The pack-box of claim 5 further comprising a packing ring sleeve disposed between the first set of packing rings and the second set of packing rings and the inner wall of the pack-box.

* * * * *